(12) United States Patent
Lee

(10) Patent No.: US 11,292,312 B2
(45) Date of Patent: Apr. 5, 2022

(54) HVAC SYSTEM FOR VEHICLE

(71) Applicants: HYUNDAI MOTOR COMPANY, Seoul (KR); KIA MOTORS CORPORATION, Seoul (KR)

(72) Inventor: Yoon Hyung Lee, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 130 days.

(21) Appl. No.: 16/793,306

(22) Filed: Feb. 18, 2020

(65) Prior Publication Data

US 2021/0053414 A1 Feb. 25, 2021

(30) Foreign Application Priority Data

Aug. 19, 2019 (KR) .......................... 10-2019-0101206

(51) Int. Cl.
 *B60H 1/00* (2006.01)
(52) U.S. Cl.
 CPC ..... *B60H 1/00028* (2013.01); *B60H 1/00521* (2013.01); *B60H 1/00564* (2013.01); *B60H 2001/00092* (2013.01)
(58) Field of Classification Search
 CPC ............ B60H 1/00028; B60H 1/00064; B60H 1/00521; B60H 1/00564; B60H 1/00592; B60H 2001/00092; B60H 1/00692; B60H 1/00042; B60H 1/00321
 USPC .................................................. 454/69–165
 See application file for complete search history.

(56) References Cited

U.S. PATENT DOCUMENTS

| 10,427,489 | B2 | 10/2019 | Lee et al. | |
| 10,507,705 | B2 | 12/2019 | Lee et al. | |
| 2004/0231834 | A1* | 11/2004 | Shibata | B60H 1/00678 165/204 |
| 2008/0295992 | A1* | 12/2008 | Shindoh | B60H 1/00671 165/42 |
| 2017/0232816 | A1* | 8/2017 | Kullen | B60H 1/2225 165/59 |
| 2018/0072131 | A1 | 3/2018 | Lee et al. | |
| 2018/0162191 | A1* | 6/2018 | Lee | B60H 1/00685 |
| 2018/0162192 | A1* | 6/2018 | Lee | B60H 1/0005 |

FOREIGN PATENT DOCUMENTS

| KR | 10-1684154 B1 | 12/2016 |
| KR | 10-2018-0068760 A | 6/2018 |
| KR | 10-2018-0068761 A | 6/2018 |

* cited by examiner

*Primary Examiner* — Vivek K Shirsat
*Assistant Examiner* — Ko-Wei Lin
(74) *Attorney, Agent, or Firm* — Lempia Summerfield Katz LLC

(57) ABSTRACT

A heating, ventilation, and air conditioning (HVAC) system for a vehicle may include: a casing having an inlet and a plurality of outlets; an evaporator disposed within the casing; a heater core disposed behind the evaporator within the casing; and an air mixing door disposed between the evaporator and the heater core. In particular, the heater core and a rear wall of the casing are spaced apart from each other by a first distance, the evaporator and the heater core are spaced apart from each other by a second distance, and the first distance is greater than the second distance.

13 Claims, 6 Drawing Sheets

HVAC SYSTEM FOR VEHICLE

CROSS-REFERENCE TO RELATED APPLICATION

This application claims priority to and the benefit of Korean Patent Application No. 10-2019-0101206, filed on Aug. 19, 2019, the entire contents of which are incorporated herein by reference.

FIELD

The present disclosure relates to a heating, ventilation, and air conditioning (HVAC) system for a vehicle.

BACKGROUND

The statements in this section merely provide background information related to the present disclosure and may not constitute prior art.

It is known to provide heating, ventilation, and air conditioning (HVAC) systems in vehicles. These HVAC systems heat and cool the air within a passenger compartment of a vehicle for the comfort of the vehicle passengers. Some vehicle HVAC systems can selectively change the source of air. In one configuration, the HVAC system draws in fresh air from outside the vehicle, conditions the air, and then pumps the conditioned air into the passenger compartment. In another configuration, the HVAC system draws in air from inside the passenger compartment, conditions the air, and then recirculates the air into the passenger compartment. In still another configuration, the HVAC system draws in a mixture of exterior air and interior air, conditions the mixed air, and then pumps the conditioned air into the passenger compartment. In the "mixture" configuration, the passengers receive a portion of fresh air, which can reduce window fogging and also make riding in the vehicle more pleasant, and receive a portion of recirculated air, which can increase fuel economy.

The vehicle HVAC system includes an evaporator, a heater core, and an air mixing door disposed within a casing. The casing has an inlet through which the air is introduced, and a plurality of outlets through which the air is discharged to the passenger compartment. The evaporator cools the air, and the heater core heats the air entering the passenger compartment. The air mixing door (also referred to as "temperature door") is disposed between the evaporator and the heater core. The evaporator is disposed upstream of the air mixing door, and the heater core is disposed downstream of the air mixing door. The air mixing door is configured to adjust the flow rate of air passing through the heater core, thereby controlling the temperature of the air entering the passenger compartment.

When the air cooled by the evaporator is introduced into the passenger compartment in a cooling mode of the HVAC system, the cooled air absorbs some heat from the heater core located downstream of the evaporator, resulting in "heat pick-up" which partially increases the temperature of the air. A heat pick-up value of the HVAC system is determined as a difference between a temperature measured at the downstream cooling space of the evaporator and a temperature measured at the outlet of the casing. The lower the heat pick-up value, the better the cooling performance.

The above information described in this background section is provided to assist in understanding the background of the inventive concept, and may include any technical concept which is not considered as the prior art that is already known to those skilled in the art.

SUMMARY

The present disclosure provides a heating, ventilation, and air conditioning (HVAC) system for a vehicle, capable of reducing or minimizing an effect of heat from a heater core on air cooled by an evaporator.

According to an aspect of the present disclosure, an HVAC system for a vehicle may include: a casing having an inlet and a plurality of outlets; an evaporator disposed within the casing; a heater core disposed behind the evaporator within the casing; and an air mixing door disposed between the evaporator and the heater core. In particular, the heater core and a rear wall of the casing may be spaced apart from each other by a first distance, the evaporator and the heater core may be spaced apart from each other by a second distance, and the first distance may be greater than the second distance.

A ratio of the first distance and the second distance may be 1.3-1.5:1.

In one form, the HVAC system may further include: a heat trap spaced apart from the rear of the heater core, and the heat trap and the heater core may be spaced apart from each other by a third distance so that a heat trap space may be defined between the heat trap and the heater core.

In another form, the heat trap may include a plate having a plurality of holes.

In other form, the HVAC system may further include: an upper support supporting a top end of the heater core, and a lower support supporting a bottom end of the heater core. The upper support may have a top sealing portion extending toward a top end of the heat trap, and the lower support may have a bottom sealing portion extending toward a bottom end of the heat trap.

A free end of the top sealing portion may abut on the top end of the heat trap, and a free end of the bottom sealing portion may abut on the bottom end of the heat trap.

The top sealing portion may be disposed on the upper support to form a unitary one-piece structure, and the bottom sealing portion may be disposed on the lower support to form a unitary one-piece structure.

The lower support may have an air pocket in which air is contained, and a top portion of the air pocket may be partially opened to the heat trap.

The HVAC system may further include: a first baffle having an extension portion extending from the upper support and an inclined portion extending obliquely downward from an end of the extension portion.

The HVAC system may further include a second baffle located below the first baffle, and the second baffle may have an extension portion extending from the heat trap, a downward inclined portion extending obliquely downward from an end of the extension portion of the second baffle, and an upward inclined portion extending obliquely upward from the downward inclined portion.

The HVAC system may further include: an upper bypass passage and a lower bypass passage which are divided by the heater core located in a downstream of the evaporator.

In one form, the air mixing door may include: an upper air mixing door movably mounted between the upper bypass passage and an upper portion of the heater core and configured to control an air flow passing through the upper bypass passage; and a lower air mixing door movably mounted between the lower bypass passage and a lower portion of the heater core and configured to control an air flow passing through the lower bypass passage.

In other form, the HVAC system may further include: an upper support to support a top end of the heater core; and a first baffle having a first portion horizontally extended from the upper support and a second portion extended from the first portion toward a bottom wall of the casing. In particular, the first baffle inhibits the flow of a cooled air from flowing from the upper bypass passage toward a heat trap disposed in a rear side of the heater core.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
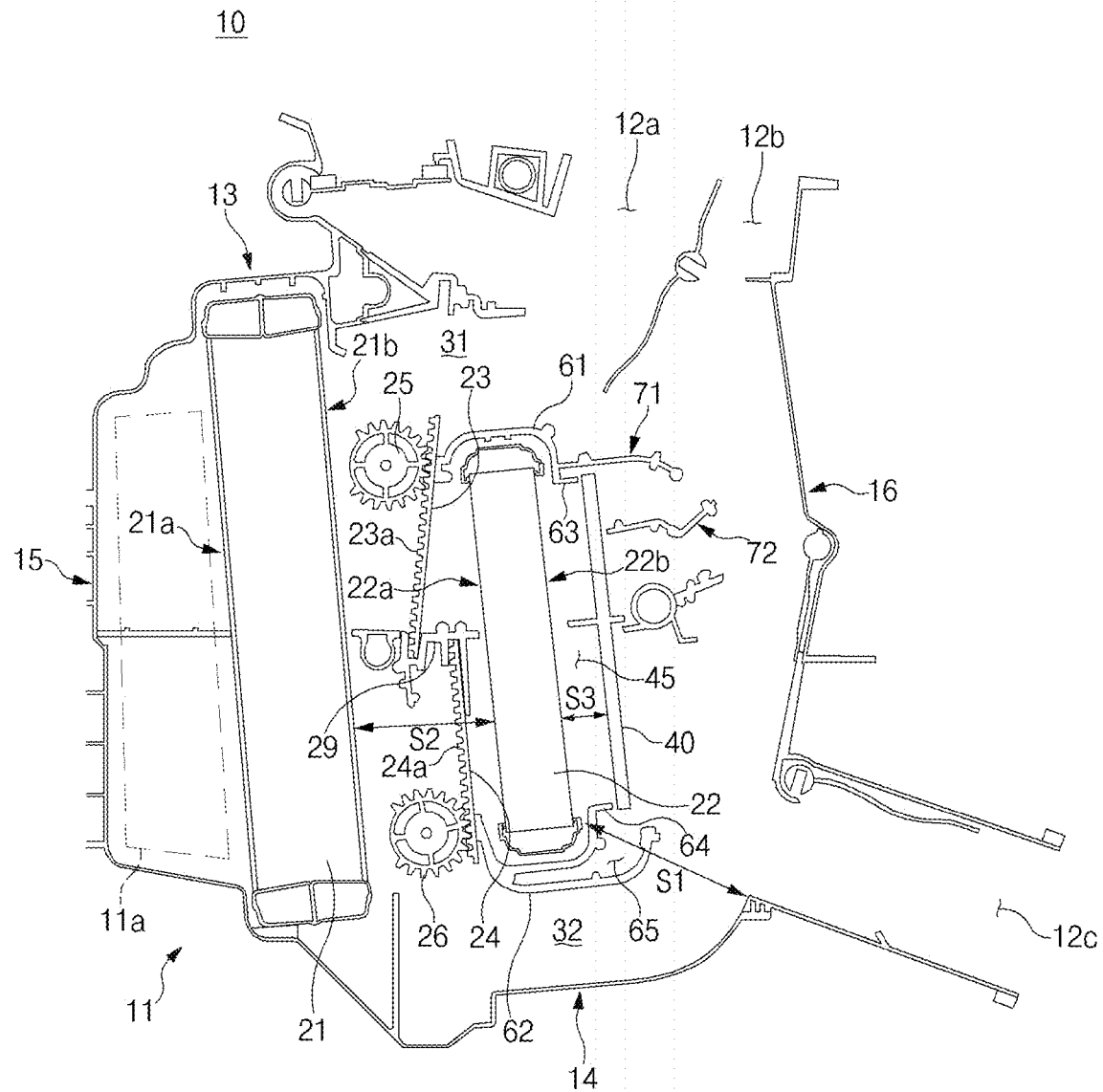
FIG. 1 illustrates a cross-sectional view of a heating, ventilation, and air conditioning (HVAC) system for a vehicle according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, exemplary forms of the present disclosure will be described in detail with reference to the accompanying drawings. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary forms of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIG. 1, a heating, ventilation, and air conditioning (HVAC) system 10 for a vehicle, according to an exemplary form of the present disclosure, may include: a casing 11, in which an evaporator 21, a heater core 22, an upper air mixing door 23, and a lower air mixing door 24 are contained. The evaporator 21, the air mixing doors 23 and 24, and the heater core 22 may be sequentially arranged along an air flow direction from upstream to downstream within the casing 11.

The casing 11 may have an inlet 11a through which air is introduced, and a plurality of outlets 12a, 12b, and 12c through which the air is discharged to a passenger compartment. An air blower may be connected to the inlet 11a. The plurality of outlets 12a, 12b, and 12c may include a first outlet 12a and a second outlet 12b provided in a top wall 13 of the casing 11, and a third outlet 12c provided in a rear wall 16 or a bottom wall 14 of the casing 11. The first outlet 12a may be a defrost vent outlet, the second outlet 12b may be a face vent outlet, and the third outlet 12c may be a foot vent outlet.

The casing 11 may have the top wall 13 facing the top of the vehicle, the bottom wall 14 facing the floor of the vehicle, a front wall 15 facing the front of the vehicle, and the rear wall 16 facing the rear of the vehicle. The front wall 15 may be adjacent to the inlet 11a, and the rear wall 16 may be adjacent to the plurality of outlets 12a, 12b, and 12c.

The evaporator 21 may be located upstream in the casing 11. In particular, the evaporator 21 may be disposed adjacent to the inlet 11a of the casing 11. The evaporator 21 may have a front face 21a facing the front wall 15 of the casing 11, and a rear face 21b facing the heater core 22.

The evaporator 21 may cool the air. For example, the evaporator 21 may operate with a known refrigeration cycle together with a compressor, a condenser, an expansion valve, and the like, and the evaporator 21 may be configured to cool the air using a refrigerant circulated by the refrigeration cycle.

The heater core 22 may be located downstream of the evaporator 21, and the heater core 22 may face the rear wall 16 of the casing 11. In particular, the heater core 22 may be disposed behind the evaporator 21. The heater core 22 may have a front face 22a facing the rear face 21b of the evaporator 21, and a rear face 22b facing the rear wall 16 of the casing 11.

The heater core 22 may heat the air. For example, the heater core 22 may be configured to heat the air using an engine coolant heated by an engine. As another example, the heater core 22 may be configured to heat the air using an electric heater.

The evaporator 21 and the heater core 22 may face each other. The evaporator 21 and the heater core 22 may be parallel to each other. The evaporator 21 and the heater core 22 may be arranged in a line. In particular, each of the evaporator 21 and the heater core 22 may be upright along a substantially vertical direction, which may reduce the length of the casing 11, thereby effectively making the HVAC system small and lightweight. As a top end of the heater core 22 is spaced apart from the top wall 13 of the casing 11, an upper bypass passage 31 may be defined by the top end of the heater core 22 and the top wall 13 of the casing 11. As a bottom end of the heater core 22 is spaced apart from the bottom wall 14 of the casing 11, a lower bypass passage 32 may be defined by the bottom end of the heater core 22 and the bottom wall 14 of the casing 11. The upper bypass passage 31 and the lower bypass passage 32 may be divided by the heater core 22 located in the downstream of the evaporator 21. The upper bypass passage 31 and the lower bypass passage 32 may be an air passage bypassing the heater core 22. In particular, the upper bypass passage 31 and the lower bypass passage 32 may be a straight passage guiding the air cooled by the evaporator 21 straightly, which may reduce the height of the casing 11 compared to the related art, thereby effectively making the HVAC system small and lightweight, and which may reduce the flow resistance of air, thereby increasing an air flow rate.

According to the exemplary form of the present disclosure, the evaporator 21 and the heater core 22 may be vertically upright, and the upper bypass passage 31 and the lower bypass passage 32 allowing the air cooled by the evaporator 21 to bypass the heater core 22 may be defined as straight passages by the heater core 22 so that the evaporator 21, the heater core 22, and an air mixing space, which is a space behind the heater core 22, may be arranged in a line within the casing 11. Thus, the height and length of the casing 11 may be significantly reduced, so that the HVAC system 10 may be effectively miniaturized and lightweight.

The upper air mixing door 23 and the lower air mixing door 24 may be disposed between the evaporator 21 and the heater core 22. The upper air mixing door 23 may be movably mounted between the upper bypass passage 31 and an upper portion of the heater core 22, thereby regulating the flow of air passing through the upper bypass passage 31. The lower air mixing door 24 may be movably mounted between the lower bypass passage 32 and a lower portion of the heater core 22, thereby regulating the flow of air passing through the lower bypass passage 32. The upper air mixing door 23 and the lower air mixing door 24 may rotate (pivot) or slide.

According to an exemplary form, the upper air mixing door 23 may have a first rack teeth 23a with which a first drive gear 25 meshes, the first rack teeth 23a may be disposed along a longitudinal direction of the upper air mixing door 23, and the upper air mixing door 23 may slide by the first drive gear 25 and the first rack teeth 23a along a substantially vertical direction. The upper air mixing door 23 may intersect with or be perpendicular to the upper bypass passage 31 at a predetermined angle. The upper air mixing door 23 may selectively adjust the amount of cooled air passing through the upper bypass passage 31 and/or the amount of heated air passing through the upper portion of the heater core 22, thereby controlling the temperature of the air.

According to an exemplary form, the lower air mixing door 24 may have a second rack teeth 24a with which a second drive gear 26 meshes, the second rack teeth 24a may be disposed along a longitudinal direction of the lower air mixing door 24, and the lower air mixing door 24 may slide by the second drive gear 26 and the second rack teeth 24a along a substantially vertical direction. The lower air mixing door 24 may intersect with or be perpendicular to the lower bypass passage 32 at a predetermined angle. The lower air mixing door 24 may selectively adjust the amount of cooled air passing through the lower bypass passage 32 and/or the amount of heated air passing through the lower portion of the heater core 22, thereby controlling the temperature of the air.

A partition 29 may be disposed in front of the heater core 22, and the partition 29 may extend horizontally. The upper air mixing door 23 may be located above the partition 29, and the lower air mixing door 24 may be located below the partition 29. Thus, a space in front of the heater core 22 may be divided into an upper space and a lower space by the partition 29.

When the air cooled by the evaporator 21 in cooling mode of the HVAC system 10 passes through the upper bypass passage 31 and the lower bypass passage 32, the cooled air may partially heat up as it absorbs some heat from the heater core 22. That is, "heat pick-up" may occur.

According to an exemplary form of the present disclosure, during the cooling mode of the HVAC system 10, in order to reduce or minimize the effect of heat from the heater core 22 on the air cooled by the evaporator 21, the rear face 22b of the heater core 22 and the rear wall 16 of the casing 11 may be spaced apart from each other. Specifically, a bottom end of the rear face 22b of the heater core 22 and a bottom end of the rear wall 16 of the casing 11 may be spaced apart from each other by a first distance S1, and the front face 22a of the heater core 22 and the rear face 21b of the evaporator 21 may be spaced apart from each other by a second distance S2. In particular, when the cooled air moves to the first and second outlets 12a and 12b through the lower bypass passage 32, it is desired to sufficiently secure the first distance S1 in order to reduce or minimize the heat transferred from the space behind the heater core 22. As the first distance S1 is increased, a heat pick-up value may be reduced. However, the first distance S1 may be regulated by the designed size of the casing 11. By relatively reducing the second distance S2, the first distance S1 may be sufficiently secured in the casing 11. For example, the first distance S1 may be 70 mm, the second distance S2 may be 53 mm. According to an exemplary form, a ratio of the first distance S1 and the second distance S2 may be S1:S2=1.3-1.5:1. The first distance S1 may be greater than the second distance S2, so that the cooled air passing through the lower bypass passage 32 may be minimally affected by the transfer of heat from the heater core 22 in the space behind the heater core 22. The space behind the heater core 22 may be the air mixing space in which the air passing through the evaporator 21 and the air passing through the heater core 22 are mixed.

The HVAC system 10, according to an exemplary form of the present disclosure, may include a heat trap 40 which is spaced apart from the rear of the heater core 22 by a third distance S3. The heater core 22 and the heat trap 40 may be arranged in parallel, and each of the heater core 22 and the heat trap 40 may be vertically upright. A heat trap space 45, in which the heat of the heater core 22 is trapped, may be defined between the rear of the heater core 22 and the heat trap 40. The heat trap 40 and the heat trap space 45 may trap the heat emitted from the heater core 22, so that the transfer of the heat from the heater core 22 to the cooled air may be substantially reduced or minimized in the cooling mode of the HVAC system 10.

The third distance S3 may be regulated by the designed size of the casing 11. The third distance S3 may be shorter than the first distance S1 and the second distance S2. According to an exemplary form, the third distance S3 may be 10-20 mm. For example, when the third distance S3 is less than 10 mm, the function of trapping the heat of the heater core 22 may be reduced, and when the third distance S3 exceeds 20 mm, the size of the casing 11 may exceed the designed size.

Figure 2:
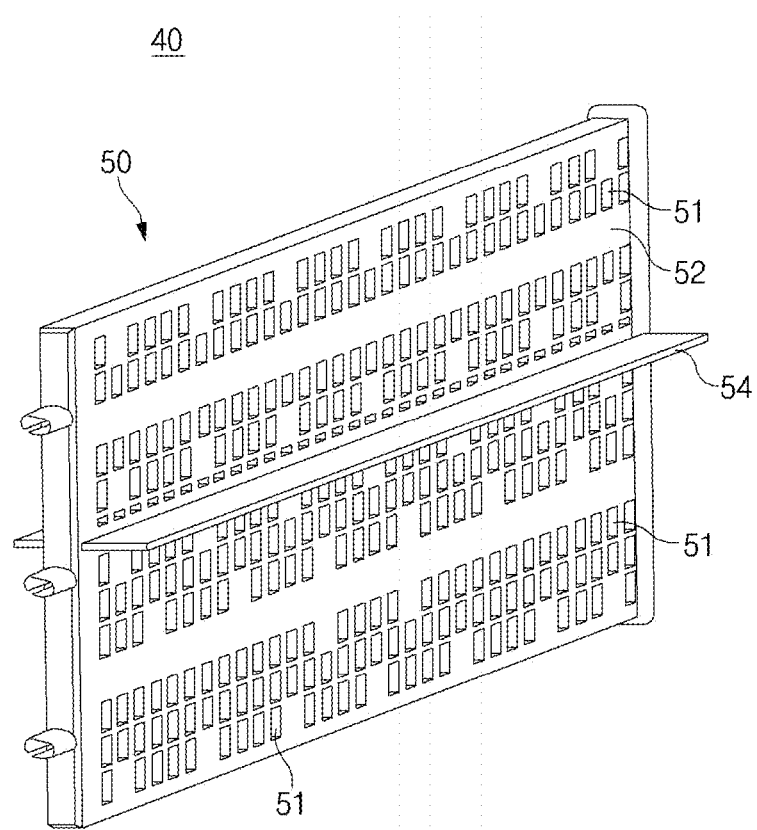
FIG. 2 illustrates a front perspective view of a heat trap used in a vehicle HVAC system according to an exemplary form of the present disclosure.
Figure 3:
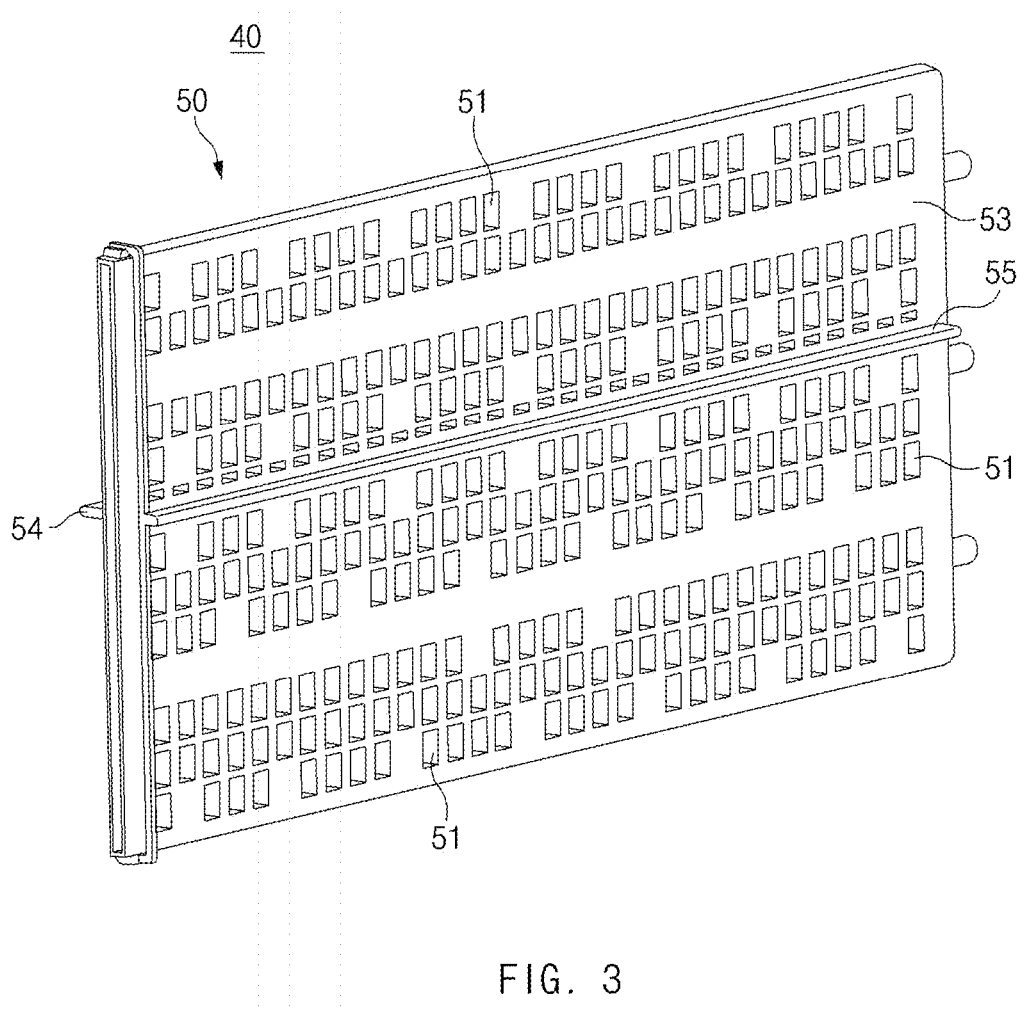
FIG. 3 illustrates a rear perspective view of a heat trap used in a vehicle HVAC system according to an exemplary form of the present disclosure.
Figure 4:
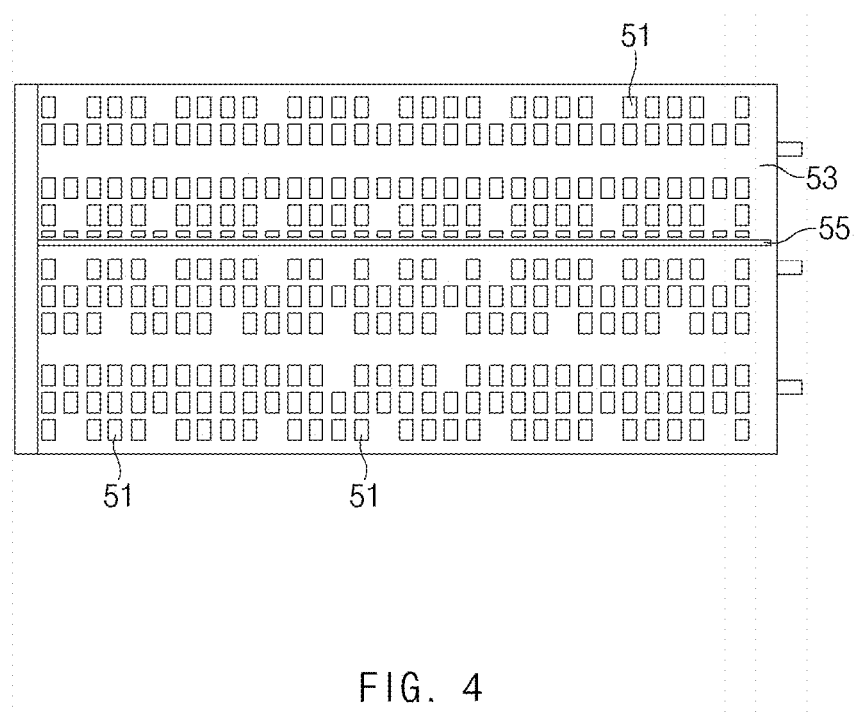
FIG. 4 illustrates a rear view of a heat trap used in a vehicle HVAC system according to an exemplary form of the present disclosure.

According to an exemplary form, the heat trap 40 may include a plate 50 having a plurality of holes 51 as illustrated in FIGS. 2 and 3. Each hole 51 may allow the air heated by passing through the heater core 22 to smoothly pass therethrough in heating mode of the HVAC system 10. The number, arrangement, and the like of the holes 51 may be varied.

The plate 50 may have a front face 52 facing the rear face 22b of the heater core 22, and a rear face 53 facing the rear wall 16 of the casing 11. The plate 50 may have a first projection 54 protruding horizontally from the front face 52 of the plate 50 toward the heater core 22, and a second projection 55 protruding horizontally from the rear face 53 of the plate 50 toward the rear wall 16 of the casing 11.

The first projection 54 and the second projection 55 may be arranged with respect to the partition 29 located in front of the heater core 22. For example, the first projection 54 and the second projection 55 may be flush with the partition 29. The space behind the heater core 22 may be divided into an upper space and a lower space by the first projection 54 and the second projection 55 of the plate 50.

According to another exemplary form, the heat trap 40 may be a positive temperature coefficient (PTC) heater used in an electric vehicle. The PTC heater may replace the heater core 22 to heat the air.

Figure 5:
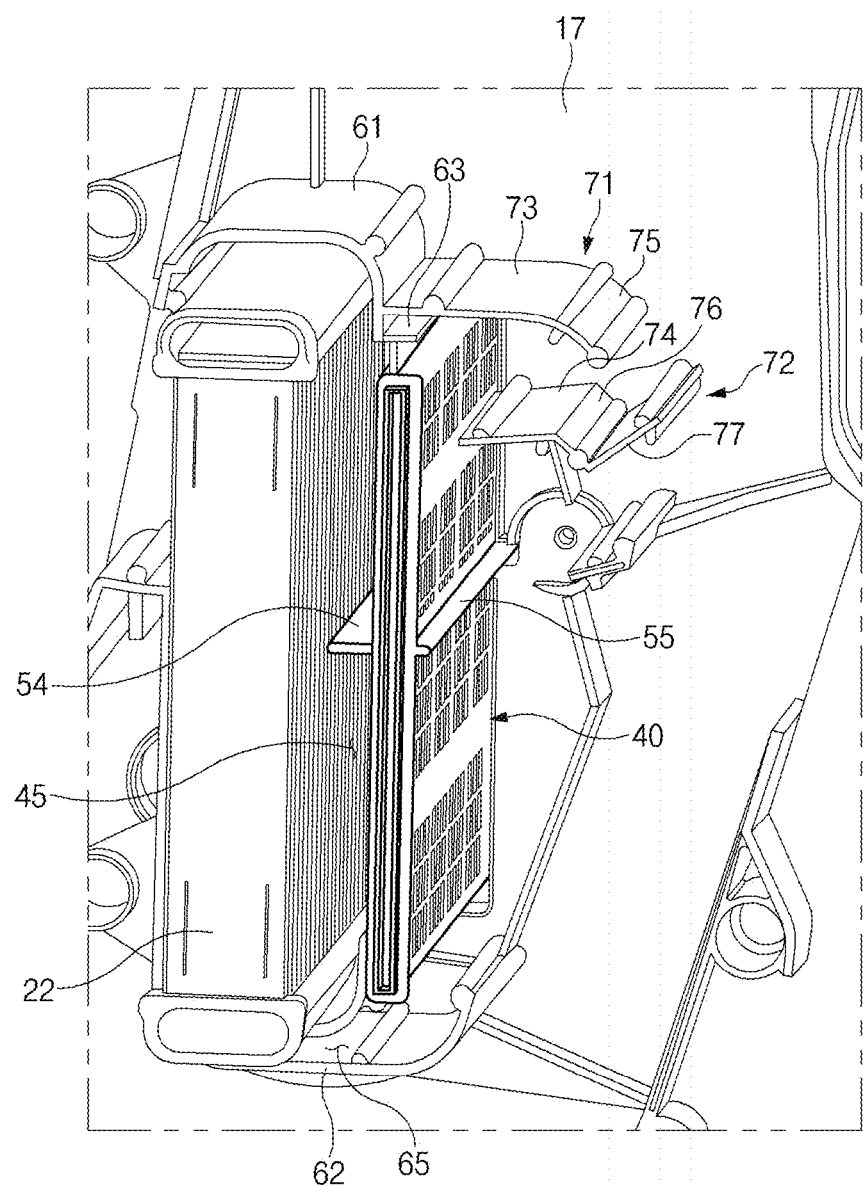
FIG. 5 illustrates a perspective view of a heat core and a heat trap within a casing in a vehicle HVAC system according to an exemplary form of the present disclosure.
Figure 6:
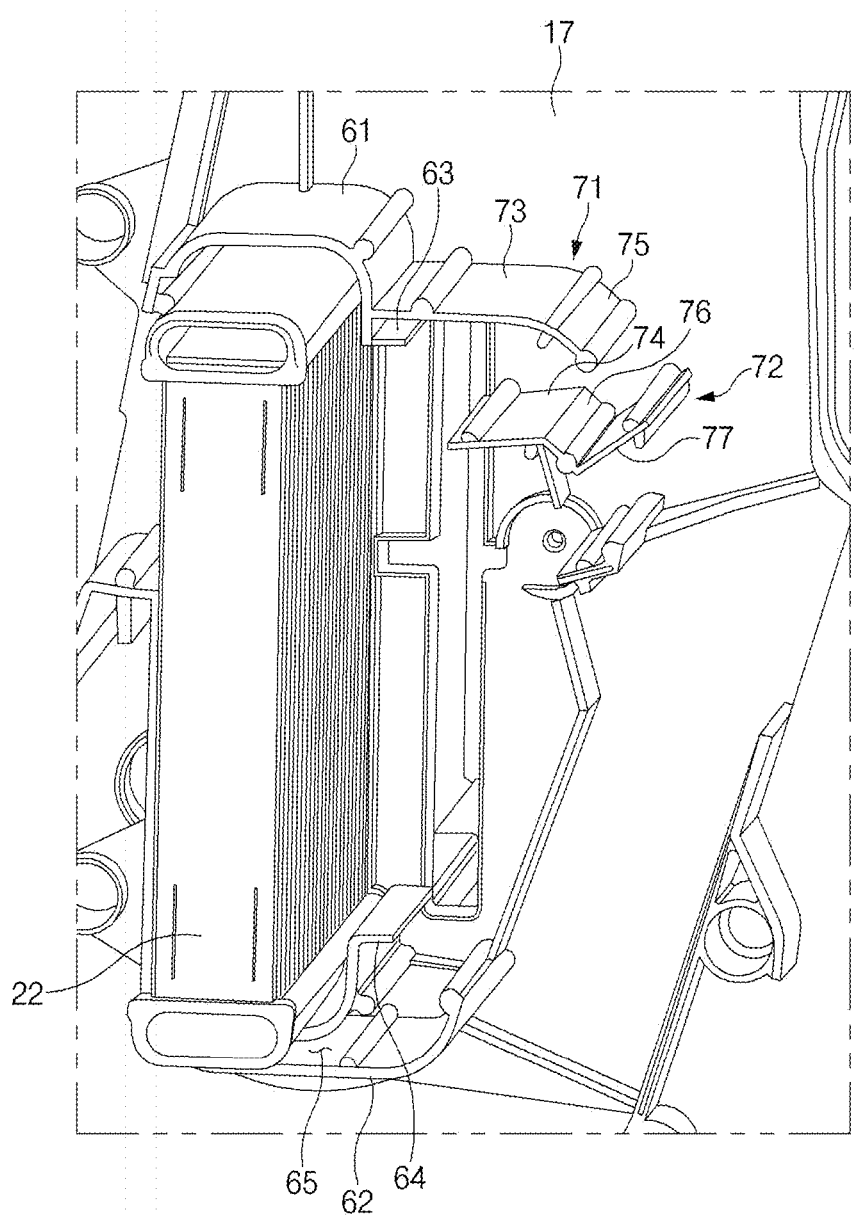
FIG. 6 illustrates a perspective view of a structure in which the heat trap of FIG. 5 is removed.

Referring to FIGS. 5 and 6, the HVAC system 10, according to an exemplary form of the present disclosure, may include an upper support 61 supporting the top end of the heater core 22, and a lower support 62 supporting the bottom end of the heater core 22. Referring to FIG. 5, the upper support 61 and the lower support 62 may extend from a sidewall 17 of the casing 11 along a width direction of the casing 11. The upper support 61 may have a top sealing portion 63 extending toward a top end of the heat trap 40, and the top sealing portion 63 and the upper support 61 may be formed as a unitary one-piece structure. A free end of the top sealing portion 63 may abut on the top end of the heat trap 40. The lower support 62 may have a bottom sealing portion 64 extending toward a bottom end of the heat trap 40, and the bottom sealing portion 64 and the lower support 62 may be formed as a unitary one-piece structure. A free end of the bottom sealing portion 64 may abut on the bottom end of the heat trap 40. The top and bottom of the heat trap space 45 between the rear face 22b of the heater core 22 and the heat trap 40 may be sealed by the top sealing portion 63 and the bottom sealing portion 64 so that the transfer of the heat from the heater core 22 to the cooled air may be significantly reduced or minimized.

Meanwhile, the lower support 62 may have an air pocket 65 in which the air is contained, and a top portion of the air pocket 65 may be partially opened to the heat trap 40. The lower support 62 may secure heat insulation by the air pocket 65, and thus the transfer of heat from the heater core 22 to the lower bypass passage 32 may be reduced or minimized.

The HVAC system 10, according to an exemplary form of the present disclosure, may further include a first baffle 71 and a second baffle 72 preventing the cooled air from flowing toward the heat trap 40 in the cooling mode.

Referring to FIGS. 5 and 6, the first baffle 71 may have an extension portion 73 extending horizontally from the upper support 61, and an inclined portion 75 extending obliquely downward from an end of the extension portion 73 toward the bottom wall 14 of the casing 11. The extension portion 73 may extend in a direction perpendicular to the heater core 22, and the inclined portion 75 may intersect with the extension portion 73 at a predetermined angle. Thus, the first baffle 71 may prevent the cooled air from flowing from the upper bypass passage 31 toward the heat trap 40.

The second baffle 72 may be located below the first baffle 71, and the second baffle 72 may extend from the sidewall 17 of the casing 11 along the width direction of the casing 11. The second baffle 72 may have an extension portion 74 perpendicular to a vertical axis of the heat trap 40, a downward inclined portion 76 extending obliquely downward from an end of the extension portion 74 toward the bottom wall 14 of the casing 11, and an upward inclined portion 77 extending obliquely upward from the downward inclined portion 76 toward the top wall 13 of the casing 11. The extension portion 74 may extend in a direction perpendicular to a vertical axis of the heater core 22 and the axis of the heat trap 40. The downward inclined portion 76 may intersect with the extension portion 74 at a predetermined angle, and the upward inclined portion 77 may intersect with the downward inclined portion 76 at a predetermined angle. The second baffle 72 may prevent the cooled air from flowing from the lower bypass passage 32 toward the heat trap 40. In addition, the second baffle 72 may induce flow resistance by the downward inclined portion 76 and the upward inclined portion 77, thereby reducing or minimizing the release of heat from the heat trap 40. In particular, the upward inclined portion 77 may allow the heat of the heat trap 40 to be more transferred to the first and second outlets 12a and 12b than the third outlet 12c, thereby preventing the temperature of the air discharged to the first and second outlets 12a and 12b from being excessively lowered in the heating mode of the HVAC system 10.

Table 1 below illustrates heat pick-up values of HVAC systems according to exemplary forms of the present disclosure and according to the related art, under the following conditions: the vehicle is running at 50 KPH; and the vehicle is in a long idle state.

TABLE 1

|  | Heat Pick-Up Values | |
| --- | --- | --- |
|  | 50 KPH | Long Idle |
| Related Art | 4.1° C. | 3.8° C. |
| First Exemplary Form | 3.5° C. (−0.6) | 3.1° C. (−0.7) |
| Second Exemplary Form | 2.8° C. (−1.3) | 2.3° C. (−1.5) |

In table 1, the HVAC system according to a first exemplary form of the present disclosure has the following configuration: the rear face 22b of the heater core 22 is spaced apart from the rear wall 16 of the casing 11 by the first distance S1; and the first and second baffles 71 and 72 are applied, and the HVAC system according to a second exemplary form of the present disclosure has the following configuration: the heat trap 40, the top sealing portion 63, and the bottom sealing portion 64 are applied.

Under the condition that the vehicle speed was 50 KPH, the heat pick-up value, according to the first exemplary form of the present disclosure, was reduced by 0.6° C. compared to the related art, and the heat pick-up value, according to the second exemplary form of the present disclosure, was reduced by 1.3° C. compared to the related art.

Under the condition that the vehicle was in a long idle state, the heat pick-up value, according to the first exemplary form of the present disclosure, was reduced by 0.7° C. compared to the related art, and the heat pick-up value, according to the second exemplary form of the present disclosure, was reduced by 1.5° C. compared to the related art.

It can be seen that the HVAC systems, according to the exemplary forms of the present disclosure, may significantly reduce or minimize the effect of heat from the heater core on the air cooled by the evaporator, and thus the heat pick-up values may be significantly reduced compared to the related art.

As set forth above, the HVAC system, according to exemplary forms of the present disclosure, may provide sufficient cooling performance by reducing or minimizing the effect of heat from the heater core on the air cooled by the evaporator.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:

1. A heating, ventilation, and air conditioning (HVAC) system for a vehicle, the HVAC system comprising:
    a casing having an inlet and a plurality of outlets;
    an evaporator disposed within the casing;
    a heater core disposed behind the evaporator within the casing; and
    an air mixing door disposed between the evaporator and the heater core,
    wherein the heater core and a rear wall of the casing are spaced apart from each other by a first distance,
    the evaporator and the heater core are spaced apart from each other by a second distance, and
    the first distance is greater than the second distance.

2. The HVAC system according to claim 1, wherein a ratio of the first distance and the second distance is from 1.3:1 to 1.5:1.

3. The HVAC system according to claim 1, further comprising: a heat trap spaced apart from a rear surface of the heater core,
    wherein the heat trap and the heater core are spaced apart from each other by a third distance so that a heat trap space is defined between the heat trap and the heater core.

4. The HVAC system according to claim 3, wherein the heat trap includes a plate having a plurality of holes.

5. The HVAC system according to claim 3, further comprising:
    an upper support configured to support a top end of the heater core, and
    a lower support configured to support a bottom end of the heater core,
    wherein the upper support has a top sealing portion extending toward a top end of the heat trap, and the lower support has a bottom sealing portion extending toward a bottom end of the heat trap.

6. The HVAC system according to claim 5, wherein a free end of the top sealing portion abuts on the top end of the heat trap, and
    a free end of the bottom sealing portion abuts on the bottom end of the heat trap.

7. The HVAC system according to claim 5, wherein the top sealing portion is disposed on the upper support to form a unitary one-piece structure, and
    the bottom sealing portion is disposed on the lower support to form a unitary one-piece structure.

8. The HVAC system according to claim 5, wherein the lower support has an air pocket configured to contain air, and
    a top portion of the air pocket is partially opened to the heat trap.

9. The HVAC system according to claim 5, further comprising: a first baffle having an extension portion extending from the upper support and an inclined portion extending obliquely downward from an end of the extension portion.

10. The HVAC system according to claim 9, further comprising: a second baffle located below the first baffle,
    wherein the second baffle has an extension portion extending from the heat trap, a downward inclined portion extending obliquely downward from an end of the extension portion of the second baffle, and an upward inclined portion extending obliquely upward from the downward inclined portion.

11. The HVAC system according to claim 1, further comprising: an upper bypass passage and a lower bypass passage, which are divided by the heater core located in a downstream of the evaporator.

12. The HVAC system according to claim 11, wherein the air mixing door comprises:
    an upper air mixing door movably mounted between the upper bypass passage and an upper portion of the heater core and configured to control an air flow passing through the upper bypass passage; and
    a lower air mixing door movably mounted between the lower bypass passage and a lower portion of the heater core and configured to control an air flow passing through the lower bypass passage.

13. The HVAC system according to claim 11, further comprising:
    an upper support configured to support a top end of the heater core; and
    a first baffle having a first portion horizontally extended from the upper support and a second portion extended from the first portion toward a bottom wall of the casing,
    wherein the first baffle is configured to inhibit a cooled air from flowing from the upper bypass passage toward a heat trap disposed in a rear side of the heater core.

* * * * *